United States Patent
Kluge

(10) Patent No.: US 7,311,015 B2
(45) Date of Patent: Dec. 25, 2007

(54) MULTI-STEP MANUAL TRANSMISSION FOR AN INTERNAL COMBUSTION ENGINE

(75) Inventor: Marc Kluge, Besigheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 214 days.

(21) Appl. No.: 10/523,779

(22) PCT Filed: Apr. 2, 2004

(86) PCT No.: PCT/EP2004/003499

§ 371 (c)(1),
(2), (4) Date: Feb. 8, 2005

(87) PCT Pub. No.: WO2004/090388

PCT Pub. Date: Oct. 21, 2004

(65) Prior Publication Data

US 2005/0247146 A1 Nov. 10, 2005

(30) Foreign Application Priority Data

Apr. 9, 2003 (DE) ................. 103 16 163

(51) Int. Cl.
*F16H 59/00* (2006.01)
*F16H 61/00* (2006.01)
*F16H 63/00* (2006.01)

(52) U.S. Cl. ............... 74/337.5; 74/330; 74/331; 74/335; 74/340; 74/473.25; 74/473.37

(58) Field of Classification Search ............. 74/325, 74/330, 331, 335, 339, 340, 337.5, 473.1, 74/473.24, 473.25, 473.26, 473.36, 473.37
See application file for complete search history.

(56) References Cited

U.S. PATENT DOCUMENTS

| | | | | |
|---|---|---|---|---|
| 3,857,299 | A * | 12/1974 | Morrison | 74/473.1 |
| 4,170,148 | A * | 10/1979 | Wolfe | 74/337.5 |
| 4,335,623 | A * | 6/1982 | Kronstadt | 74/473.21 |
| 4,432,251 | A * | 2/1984 | Malott | 74/337.5 |
| 6,286,381 | B1 * | 9/2001 | Reed, Jr. et al. | 74/336 R |
| 6,422,107 | B1 * | 7/2002 | Kidokoro et al. | 74/473.3 |
| 6,427,548 | B1 | 8/2002 | Leimbach et al. | |
| 2004/0093972 | A1 * | 5/2004 | Gumpoltsberger et al. | 74/325 |
| 2006/0117892 | A1 * | 6/2006 | Ebenhoch et al. | 74/473.1 |
| 2006/0150761 | A1 * | 7/2006 | Beer et al. | 74/335 |

FOREIGN PATENT DOCUMENTS

| | | |
|---|---|---|
| DE | 100 38 090 A1 | 2/2002 |
| FR | 2 815 103 A | 4/2002 |
| WO | WO 2004/008005 | 1/2004 |

* cited by examiner

Primary Examiner—David D. Le
(74) Attorney, Agent, or Firm—Crowell & Moring LLP

(57) ABSTRACT

A multistage transmission for an internal combustion engine has a disconnect-type clutch, a drive shaft and a driven shift on which engaged gear wheels are arranged to achieve different gear steps. Clutches actuated via shift forks are used to move the speed gears to generate a frictional connection with the gear shaft. The gear change is effected by a control cable and/or gearshift linkage. The gear pairs for the even gears and for the odd gears are arranged side-by-side like a dual clutch gear set. To implement an H shift pattern to actuate the clutches of the even gears and the odd gears a shifter shaft is provided, respectively. The two shifter shafts can be controlled via a common selector and/or shift control system.

7 Claims, 11 Drawing Sheets

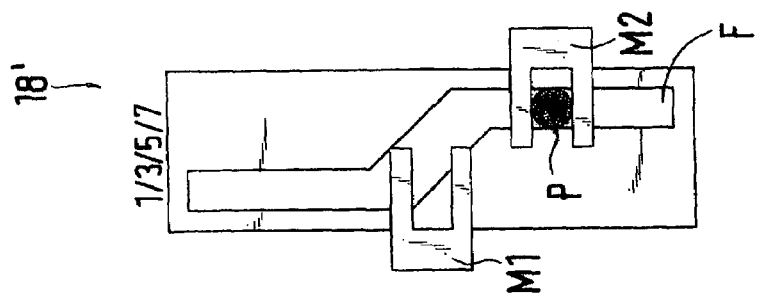
Fig. 20
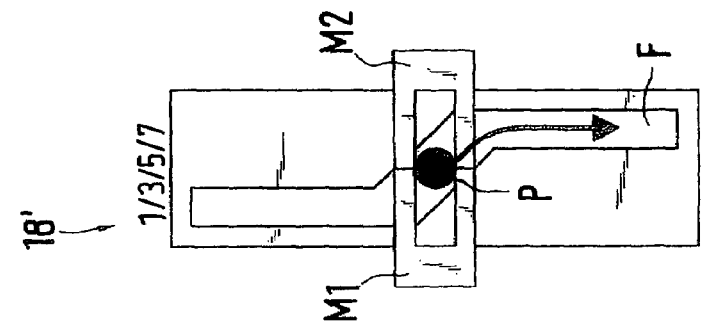
Fig. 19
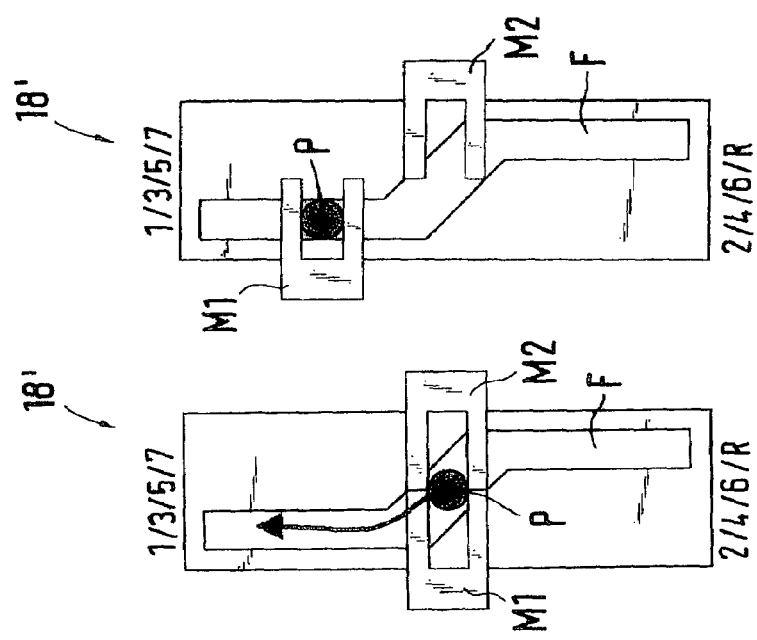
Fig. 18
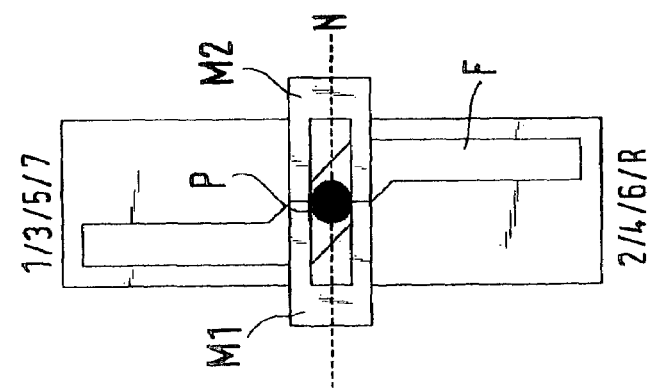

MULTI-STEP MANUAL TRANSMISSION FOR AN INTERNAL COMBUSTION ENGINE

This application claims the priority of PCT/EP2004/003499, filed Apr. 2, 2004 which claims priority to German Application No. 10316163.5 filed Apr. 9, 2003, the disclosure of which is expressly incorporated by reference herein.

BACKGROUND AND SUMMARY OF THE INVENTION

The present invention is based on a multistage transmission for an internal combustion engine comprising a disconnect-type clutch, a drive shaft, driven shaft on which engaged gearwheels are arranged to achieve different gear steps, clutches are arranged to be actuated via shift forks to move speed gears and to generate a frictional connection with the drive shaft, and a control cable and/or a gearshift linkage arrangement to effect a gear change.

So-called dual clutch transmissions (see, for example, DE 100 38 090 A1) have been known in automotive engineering for many years and are increasingly used in the sports car sector to combine the lower fuel consumption and the sporty appearance of a manual transmission with the comfort of an automatic transmission. While the one train is used to drive the car, the next gear step can be preselected on the other train. The main attraction is the use of known and field-proven shift components (synchronization devices and clutches).

Based on function, the gear set arrangement for a dual clutch transmission is selected such that the even and odd gears are arranged on separate, specially provided input shafts. To be able to use such a dual clutch gear set for a conventional manual transmission (keyword: "same parts" principle) would require, for example, hydraulic control of the synchronization devices associated with the individual gears. With a traditional internal gearshift, the familiar H shift pattern in the manual transmission could not be implemented.

SUMMARY OF THE INVENTION

Thus, an object of the present invention is to provide a shift control system for the gear set arrangement of a dual clutch transmission which can be used to implement a conventional H shift pattern.

This object is attained by by providing that the gear pairs for the even gears and the odd gears are arranged side by side in a dual clutch gear set-like manner, wherein shifter shafts are operable via at least one of a common selector control and a gearshift control system to implement an H-shift pattern for actuating the clutches of the even and odd gears.

With the inventive gearshift control system, a conventional manual transmission with an H shift pattern can advantageously be implemented despite a dual clutch gear set. This makes it possible to further increase the number of identical components for different transmission configurations and to simultaneously reduce the production costs.

To control the shifting of the individual gears, a gate element equipped with the cable control or gearshift linkage is provided. For each of the two shifter shafts, a lever idler assembly whose one end is coupled to the gate element and the other end to the shifter shaft. The rotary motion of the shifter shafts, which is required to shift the even and odd gears, is thereby made possible in a very simple manner.

The rotary motion transmitted via the gate element and the corresponding idler system to the respective shifter shaft is effected via a pin arranged at the end of the idler assembly, which engages with a guide groove of a bushing disposed on the corresponding shifter shaft.

The shifter shafts have shift fingers that interact with shift openings of shift plates. The shift plates are integrally connected with shift forks, such that a rotary motion of the shifter shaft is converted to a linear motion of the selected shift plate.

The use of two shift fingers, axially and radially offset 180° on each shifter shaft and interacting with two shift openings in a shift plate, which are likewise offset 180° in relation to each other, makes it possible to shift the even or odd gears in the same direction—corresponding to the H shift pattern—(even gears forward, odd gears back).

To preselect the corresponding gears a lever system is provided, which is connected to the cable control or the gearshift linkage and which is coupled to the two shifter shafts via a lever arm each. The lever system enables a linear motion of the two shifter shafts to preselect different shift tracks.

Advantageously the two main shifter shafts each have an associated locking bar, which is axially guided via the shifter shaft and has a locking structure for the non-selected shift forks.

Other objects, advantages and novel features of the present invention will become apparent from the following detailed description of the invention when considered in conjunction with the accompanying drawings.

BRIEF DESCRIPTION OF THE DRAWINGS

FIG. 18 is a detailed view of the gate track for the second embodiment, FIG. 19 is a view showing a first shift position of the second embodiment, and FIG. 20 is a view showing a second shift position of the second embodiment.

DETAILED DESCRIPTION OF THE DRAWINGS

Figure 1:
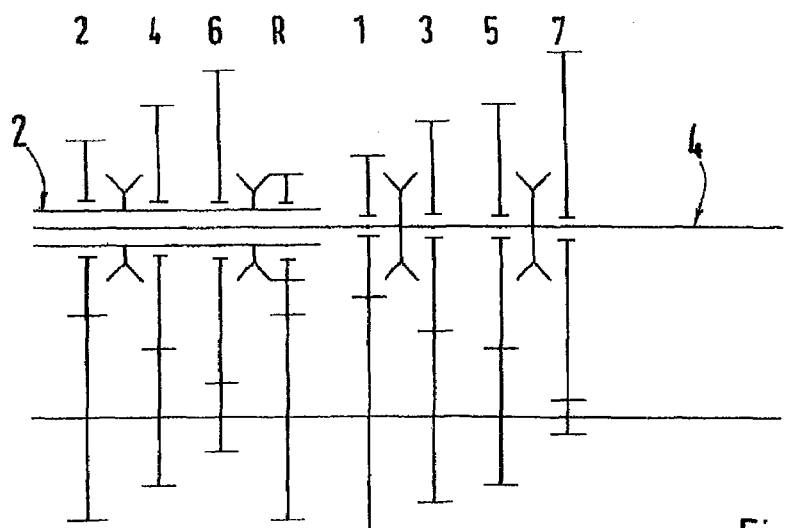
FIG. 1 is a schematic diagram of a gear set arrangement of a dual clutch transmission.

FIG. 1 shows the gear set arrangement of a 7-gear dual clutch transmission. The even gears 2-4-6 and the reverse gear R are arranged on a first input shaft 2 while the odd gears 1-3-5-7 are arranged on a second input shaft 4 disposed coaxially to the first input shaft 2.

To make this gear set arrangement accessible to a conventional H gearshift with tractive force interruption, a mechanical gear engagement system is required in addition to a rotationally fixed connection (e.g., through spline gearing) of the two input shafts 2 and 4. This shift control system will now be described in greater detail.

The forward gears G1 to G7 and the reverse gear R, which are arranged on the two input shafts 2, 4, are assigned (synchronization) clutches S1 to S4, which use four shift forks 6, 8, 10 and 12 to optionally establish a corresponding rotationally fixed connection between the selected speed gear and the input shaft 2, 4. The clutch S3 is responsible for shifting the even gears G2 and G4 and the clutch S4 for the gears G6 and R. For the odd gears the clutch S1 is responsible for the gears G1 and G3 and the clutch S2 for the gears G5 and G7. A first shifter shaft 14 is provided to shift the odd gears G1, G3, G5, G7, and a second shifter shaft 16 is provided for the gears G2, G4, G6 and the reverse gear R. For the shifting of all the gears, for which a corresponding rotary motion of the shifter shafts 14 and 16 is required, a common gate element isolated in FIG. 2 and identified generally by numeral 18 is provided for the two shifter shafts 14, 16.

Figure 3:
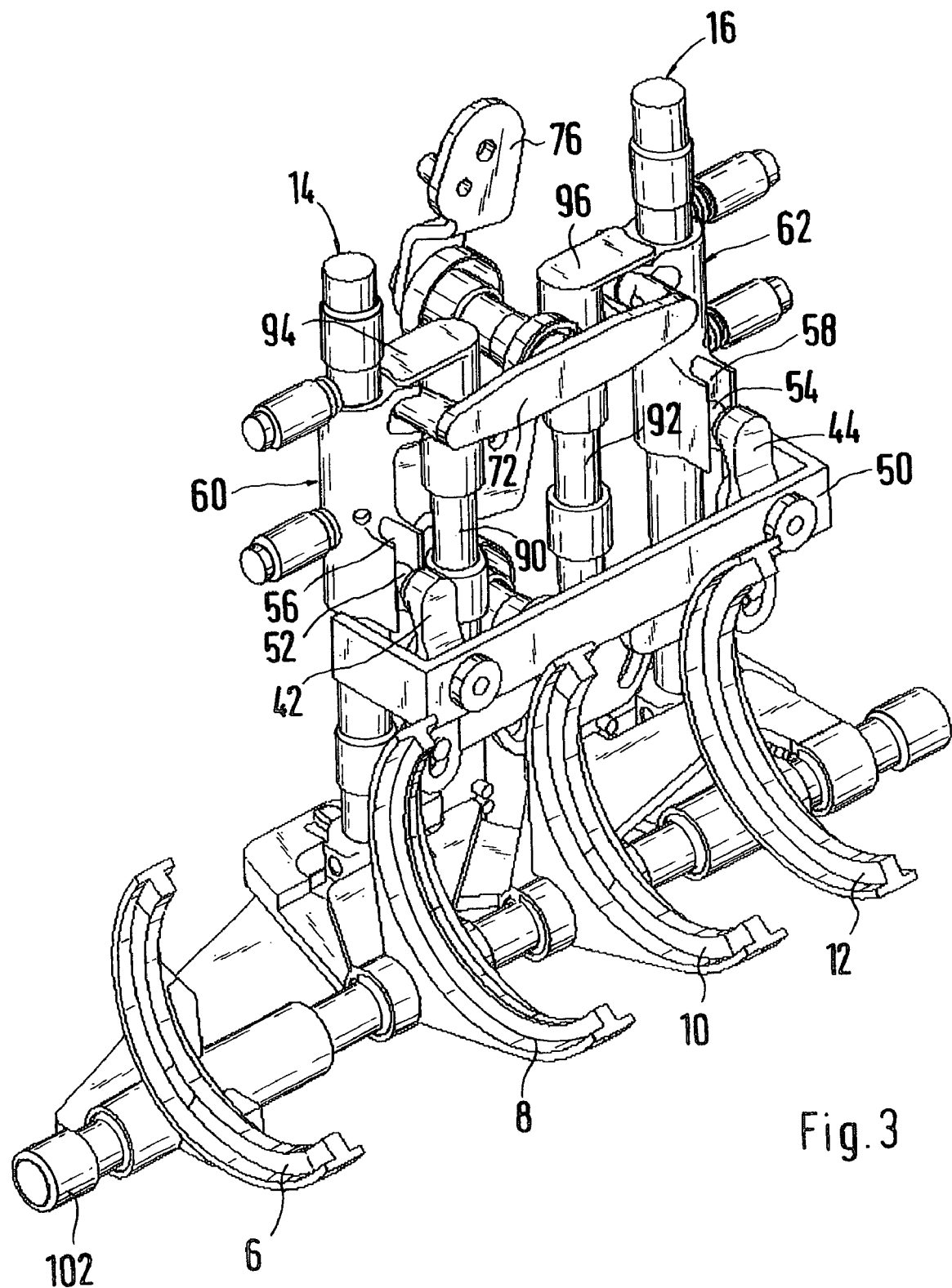
FIG. 3 is a perspective view of the gearshift control system of FIG. 2.
Figure 6:
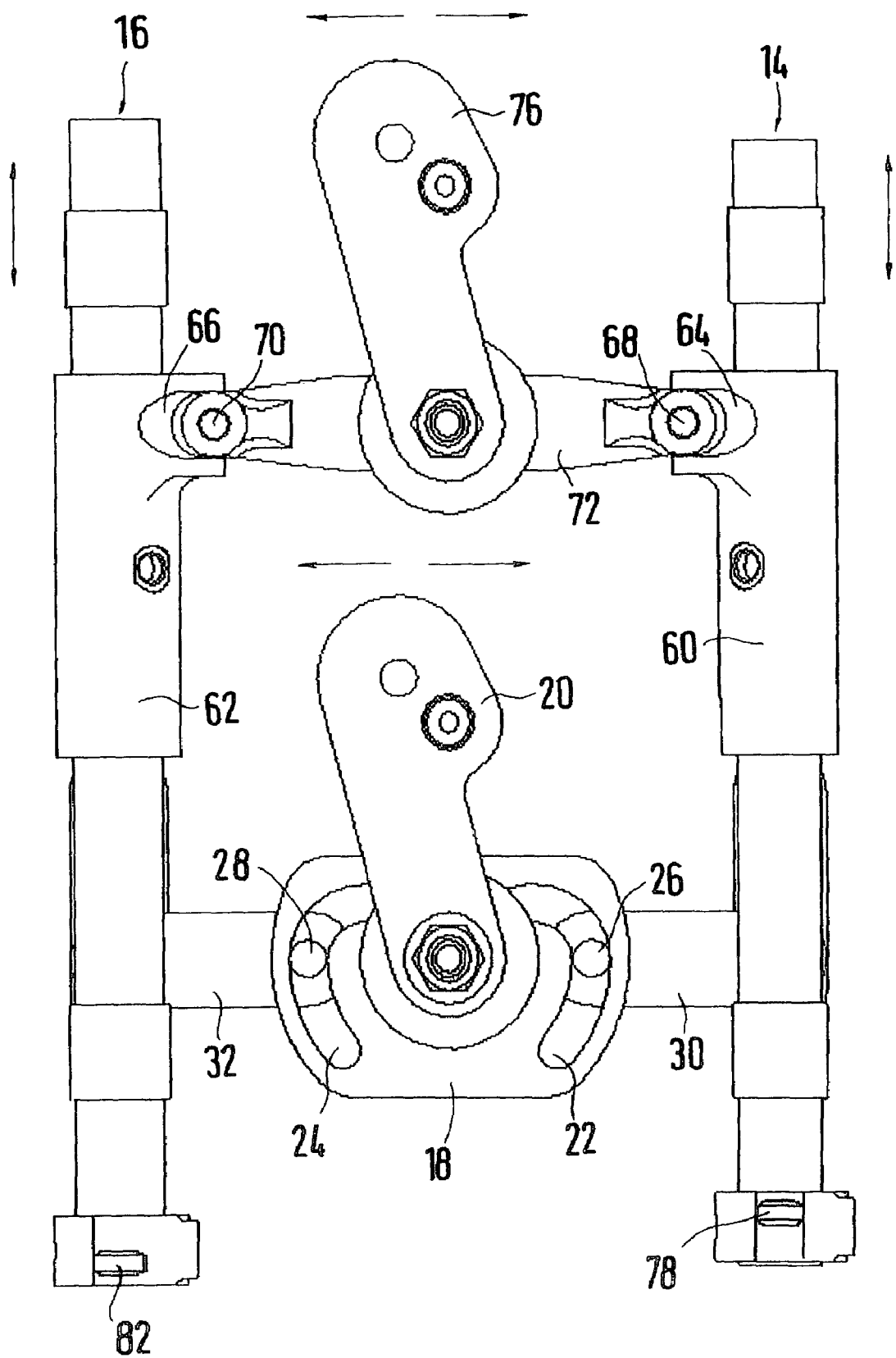
FIGS. 6 and 7 are plan views of a simplified shift and selection pattern of the gearshift device shown in FIGS. 2 to 5.
Figure 7:
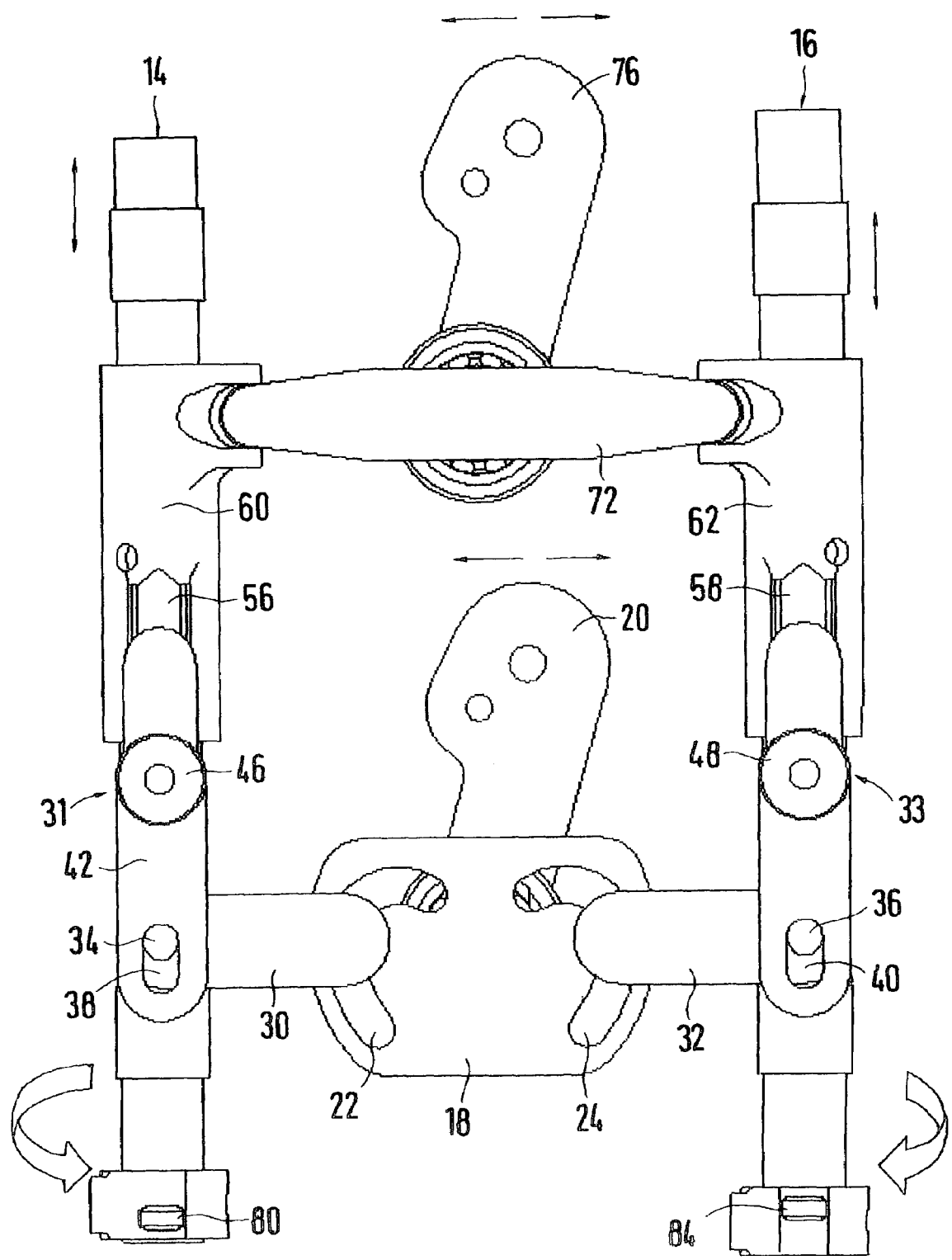

The gate element 18 has a lever element 20, to which a cable control or gearshift linkage connected to the gearshift lever of the vehicle is coupled. As seen in FIGS. 6 and 7, the gate element 18 has two guide tracks 22 and 24 with which a respective guide pin 26, 28 engages. The guide pins 26, 28 are each fixed to a first idler lever 30, 32, which are components of an idler system 31, 33 provided for the two shifter shafts 14, 16 and which are configured identically for the two shifter shafts 14, 16. At the other end of each first idler lever 30, 32 an additional guide pin 34 and 36 engages with an oblong hole 38, 40 of a second idler lever 42, 44. The two idler levers 42, 44 each have a bearing eye 46, 48, which is received in a bearing stud (not depicted) of a common bearing bracket 50 (see FIG. 3). At their other end, the two idler levers 42, 44 have a respective guide pin 52, 54, each of which engages with a respective guide groove 56, 58. Each guide groove 56, 58 is integrally formed from a bushing 60, 62, which is non-rotatably connected to the respective shifter shaft 14, 16.

Figure 4:
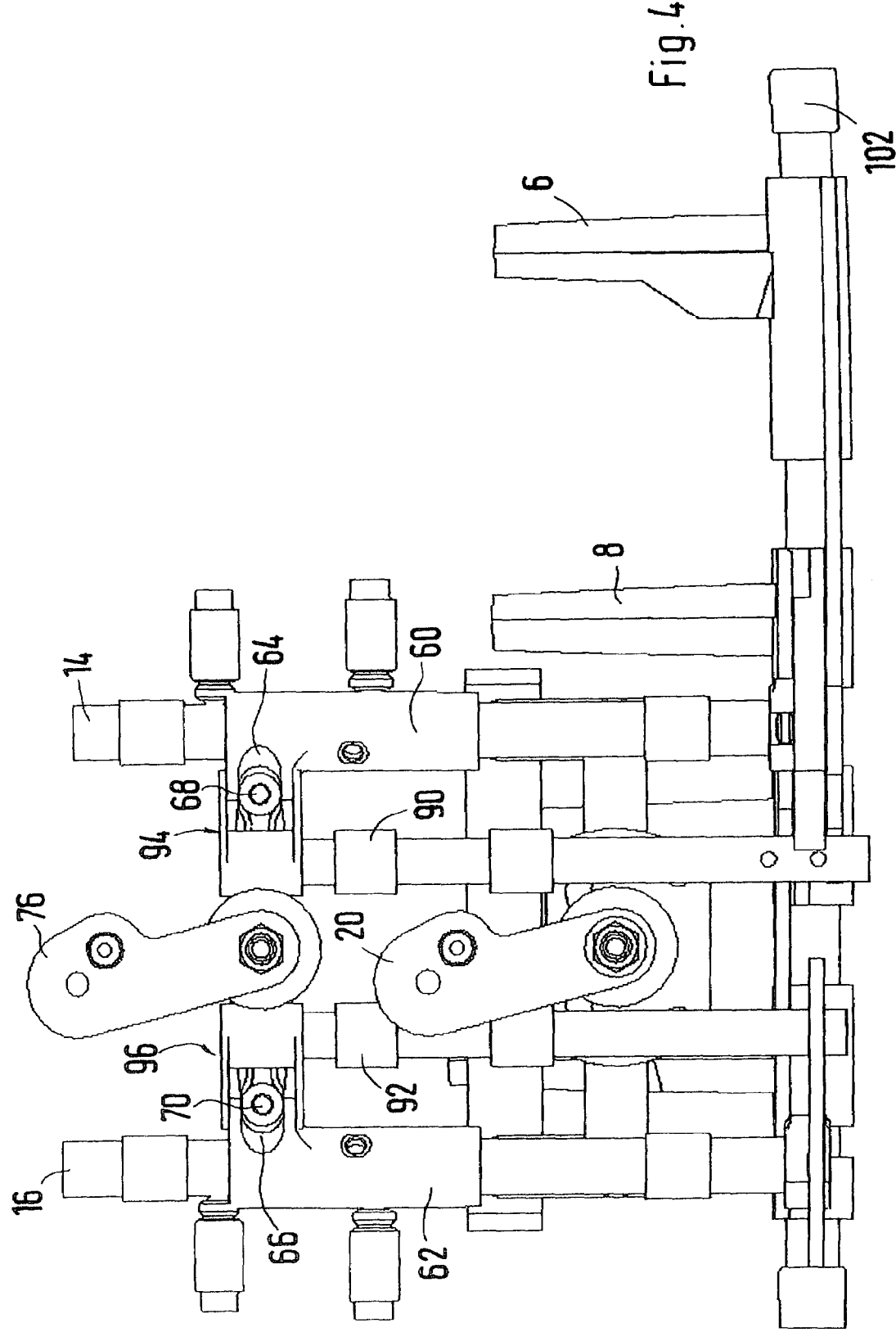
FIG. 4 is a front view of the gearshift control system of FIGS. 2 and 3.
Figure 5:
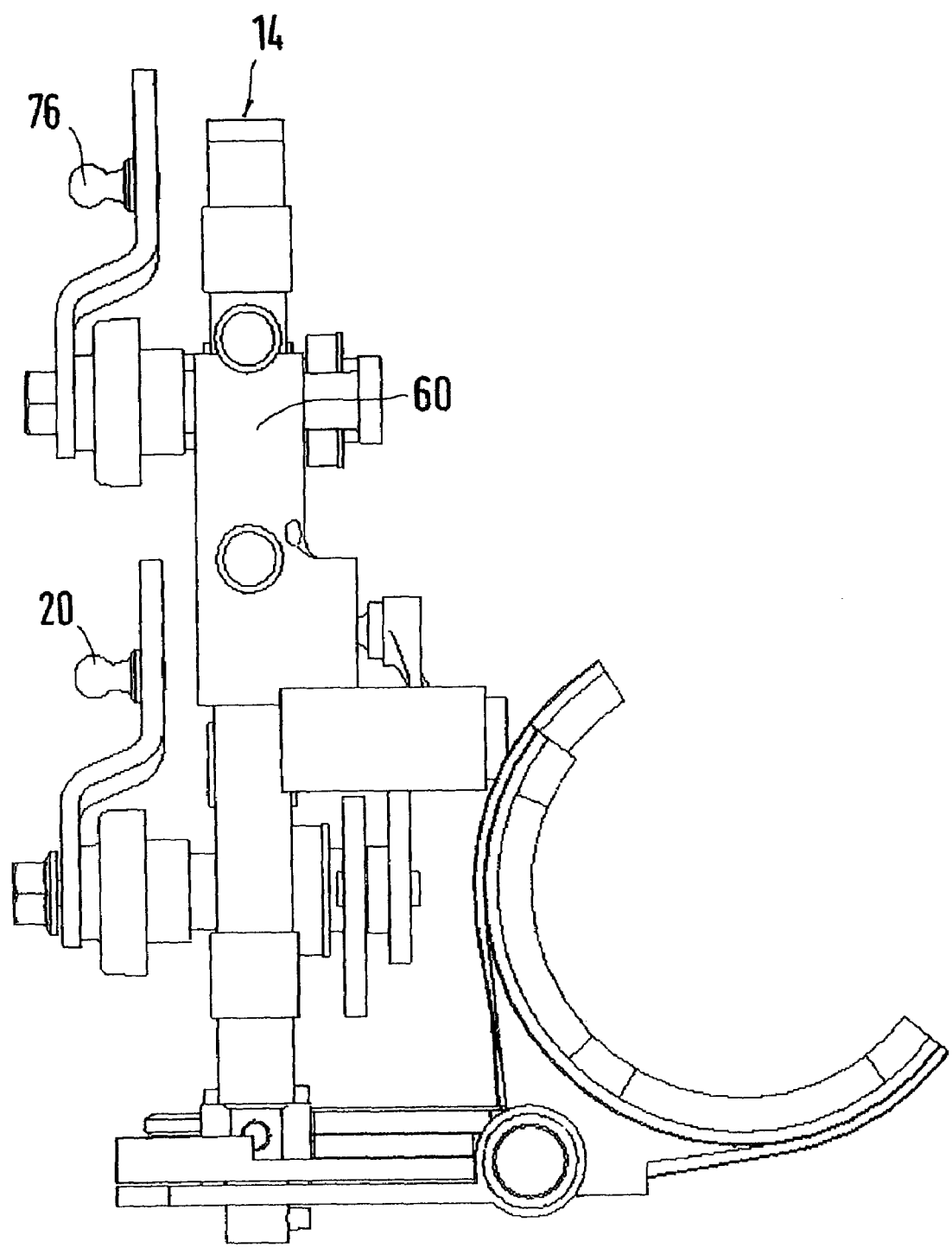
FIG. 5 is an end view of the gearshift control system of FIGS. 2, 3 and 4.

At the upper end of each of the two bushings 60, 62 a second guide groove 64, 66 is formed with which a guide pin 68, 70 provided for the selector control engages (see FIG. 4). The two guide pins 68, 70 are arranged at the ends of a lever element 72 supported in the center of a housing (not depicted). At the other end of the bearing axis 74 connected to the lever element 72, a selector lever 76 is arranged, which is connectable with a cable control or a selector linkage.

Figure 2:
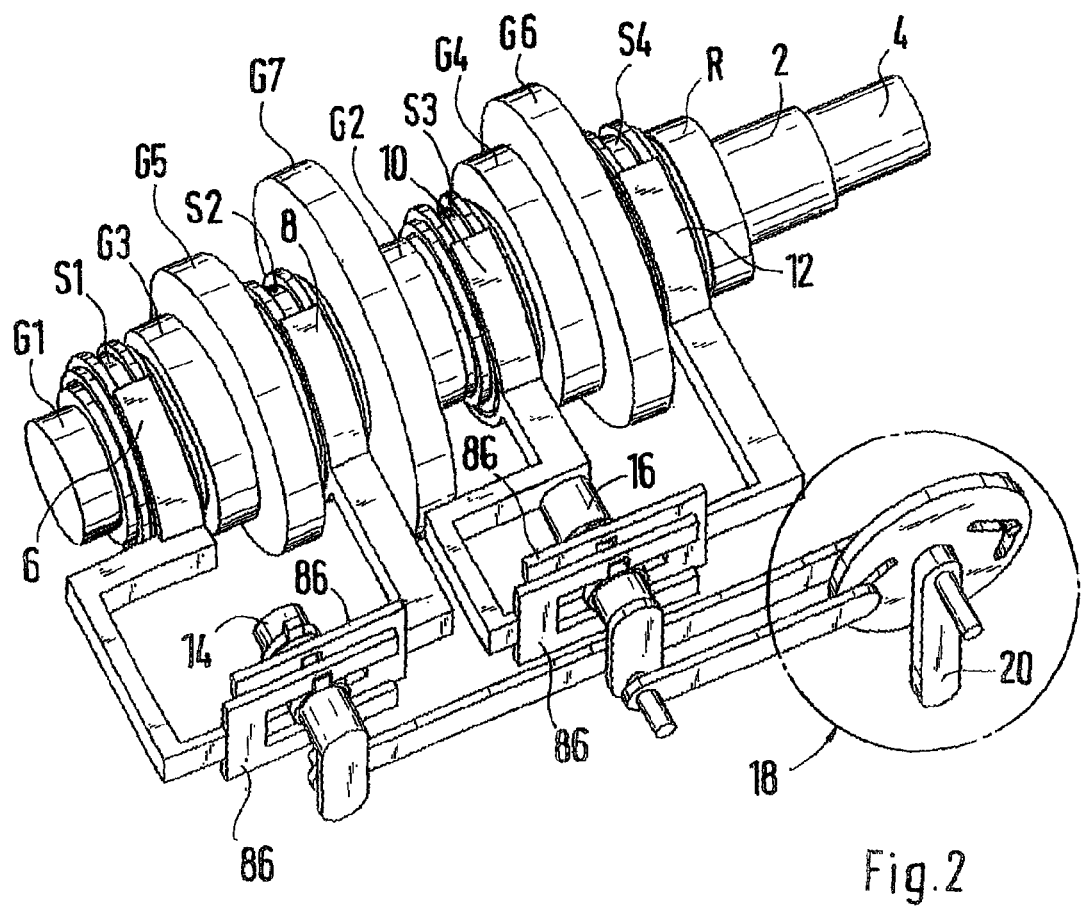
FIG. 2 is a perspective schematic view of the mechanical gearshift control system in accordance with the present invention.
Figure 8:
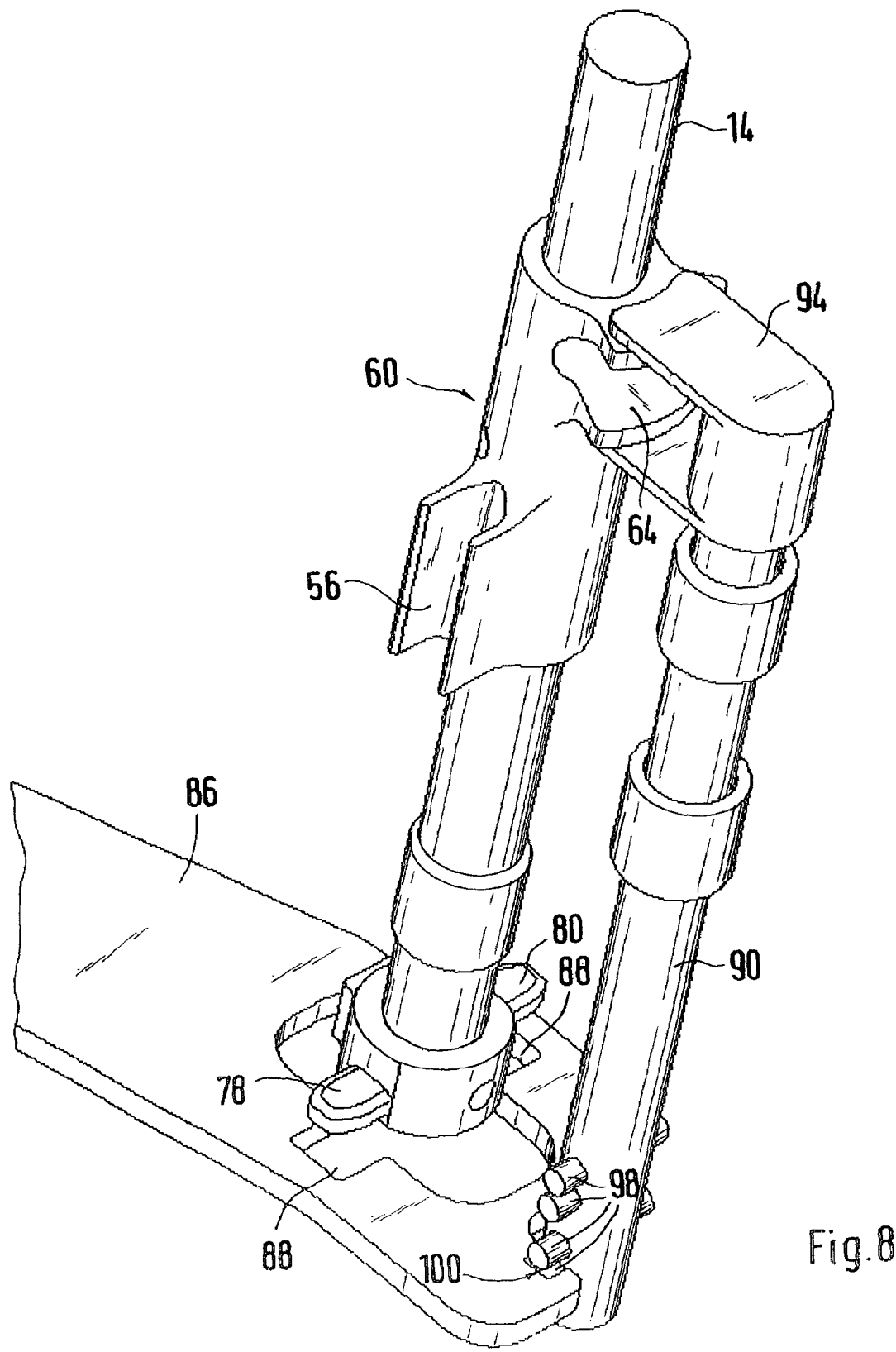
FIG. 8 is a perspective view of a locking mechanism of the gearshift control system for non-selected shift forks.
Figure 13:
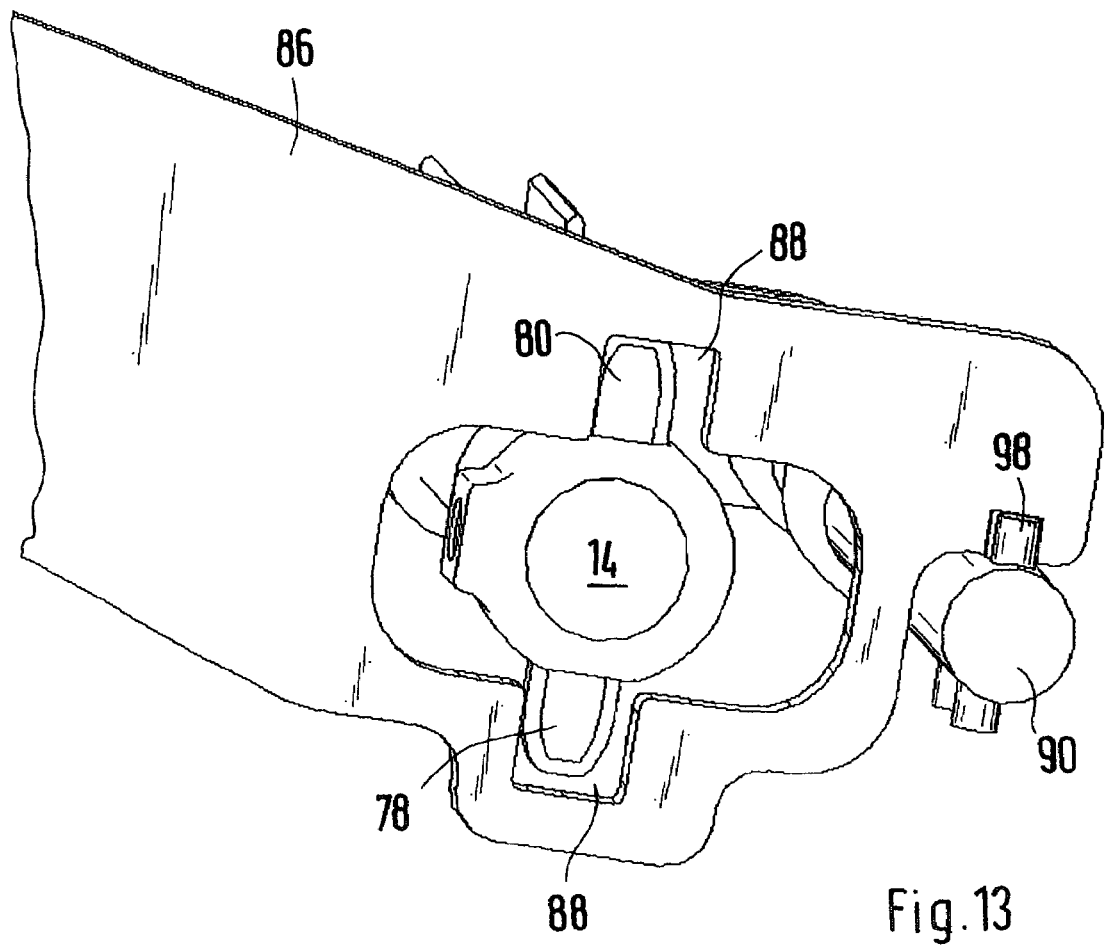

The lower ends of the two shifter shafts 14, 16 are each provided with two shift fingers 78 to 84, which are arranged axially and radially offset 180° (see FIGS. 7, 8 and 13). To shift the individual gears, the shift fingers 78 to 84 arranged on the two shifter shafts 14 and 16 cooperate with the shift openings 88 made in the shift plates 86. As shown in FIG. 2, the shift plates 86 are integrally connected to the shift forks 6 to 12.

In the gearshift housing (not depicted), two shafts 90, 92 are arranged parallel to the two shifter shafts 14, 16 and are supported in the gearshift housing so as to be locked against rotation. At their one end, the shafts 90, 92 have a fork-shaped claw 94, 96, which encircles the walls of the two guide grooves 64, 66 formed in the two bushings 60, 62. At the other end of the two shafts 90, 92, four locking pins 98 for four different locking positions which correspond to the four possible shift tracks are provided on each shaft for two shift plates, respectively (see FIG. 8). The locking pins 98 interact with the locking grooves 100 that are disposed in the shift plates 86, as will be explained in greater detail below.

The shift control system, which also includes a preselection of the corresponding gears, will now be explained in greater detail with reference to FIGS. 9 to 16.

Figure 9:
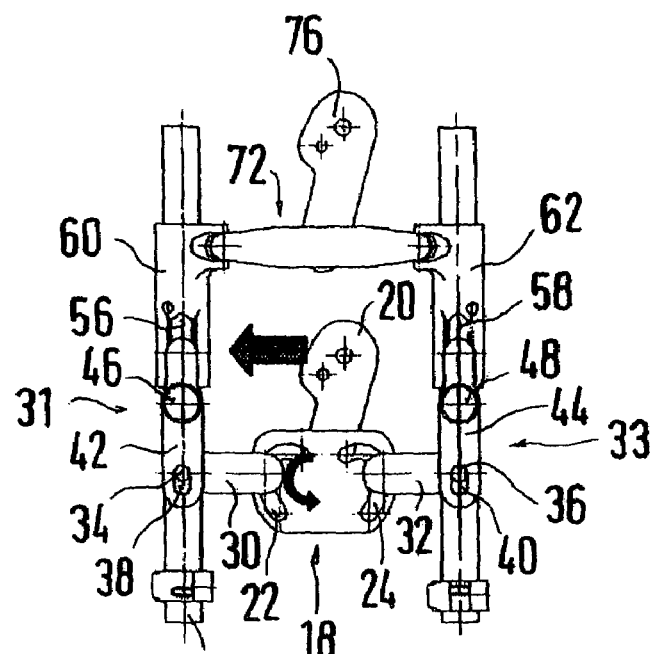
FIGS. 9 through 15 are schematic views of gear change processes.
Figure 10:
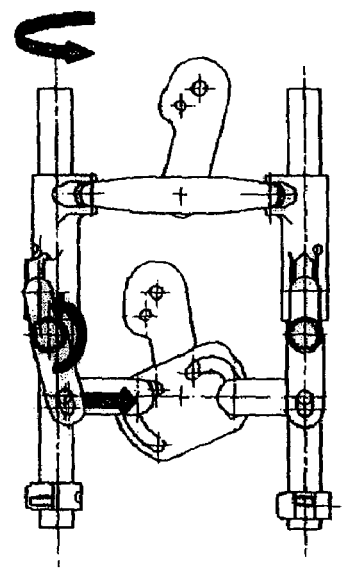

By moving the shift lever in the H gate (1st gear) the lever element 20 is moved via the control cable or the gearshift linkage in the direction indicated by the broad arrow in FIG. 9. The shifter shaft 14 is rotated in the direction of the arrow (counter clockwise as shown in FIG. 10) via the gate element 18, the idler system 31 and the bushing 60. This rotary motion is converted into a linear displacement of the shift fork S1 via the shift finger which engages with the corresponding shift plate 86. This establishes a conventional rotationally fixed connection between the speed gear or the idler gear G1 and the gear shaft 4. While the first shifter shaft 14 executes a rotary motion, the shifter shaft 16 does not rotate in this state because of the course of the guide track 24.

Figure 11:
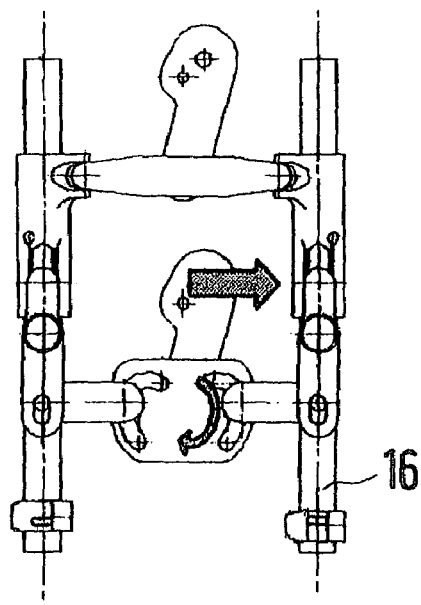
Figure 12:
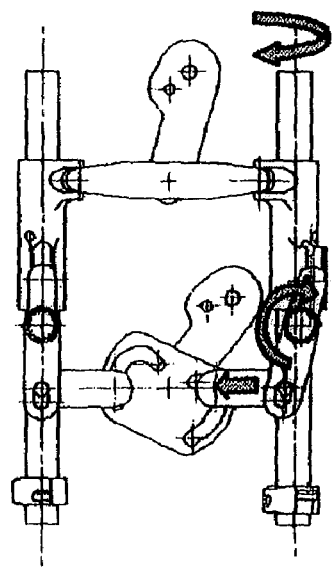

When shifting up from the first to the second gear, the lever element 20 is displaced via the gearshift lever of the vehicle in the direction indicated by the broad arrow in FIGS. 11 and 12. When a center position is reached (see FIG. 11) the 1st gear is disengaged again. When the right end position is reached (see FIG. 12), the shifter shaft 16 is now correspondingly rotated because of the course of the guide track 24. This rotary motion establishes a rotationally fixed connection between the speed gear or idler wheel G2 and the gear shaft 2, analogous to the 1st gear.

To shift up from the second to the third gear, an axial displacement of the shifter shaft 14 is required because of the necessary switch in the shift track. This is accomplished by the selector lever 76 which moves both the shifter shaft 14 and the shifter shaft 16 to a new shift track (see FIG. 16).

Figure 14:
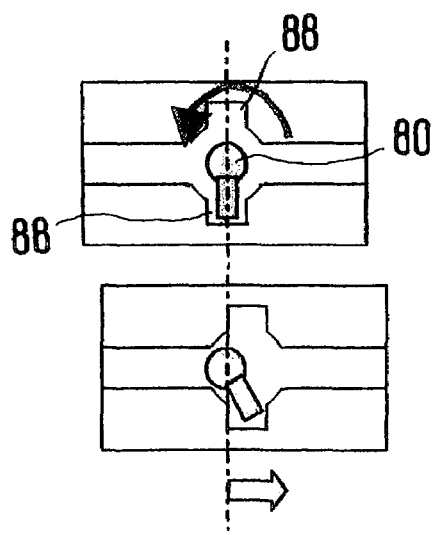
Figure 15:
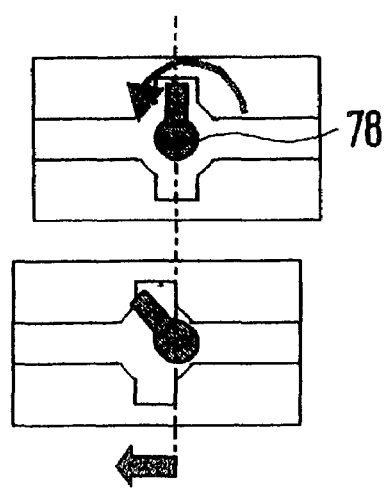
Figure 16:
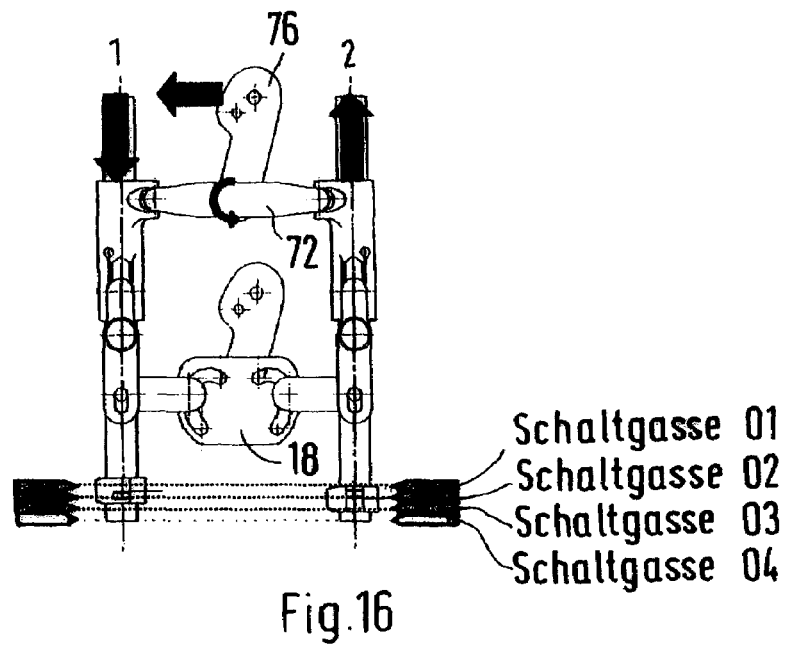
FIG. 16 is a schematic view of a selection process.

The shifting to the 3rd gear is effected analogously to the preceding gearshifts. As shown in FIGS. 13 to 15, the shift finger 80 opposite the shift finger 78 now engages with the associated shift opening 88 and establishes a rotationally fixed connection between the speed gear G3 and the gear shaft 4 by way of the rotary motion of the shifter shaft 14.

The remaining gears G4 to G7 and the reverse gear R are shifted and preselected according to the same pattern, as described above.

To prevent any unintended displacement of the non-engaged shift forks on the shift axis 102, the locking pins 98 provided on the two locking shafts 90, 92 engage with the locking grooves 100 of those shift plates whose shift forks are not engaged (keyhole function), as shown, for example, in FIG. 8. The shafts 90 and 92 are axially guided by means of the claws 94 and 96 via the shifter shafts 14 and 16.

Figure 17:
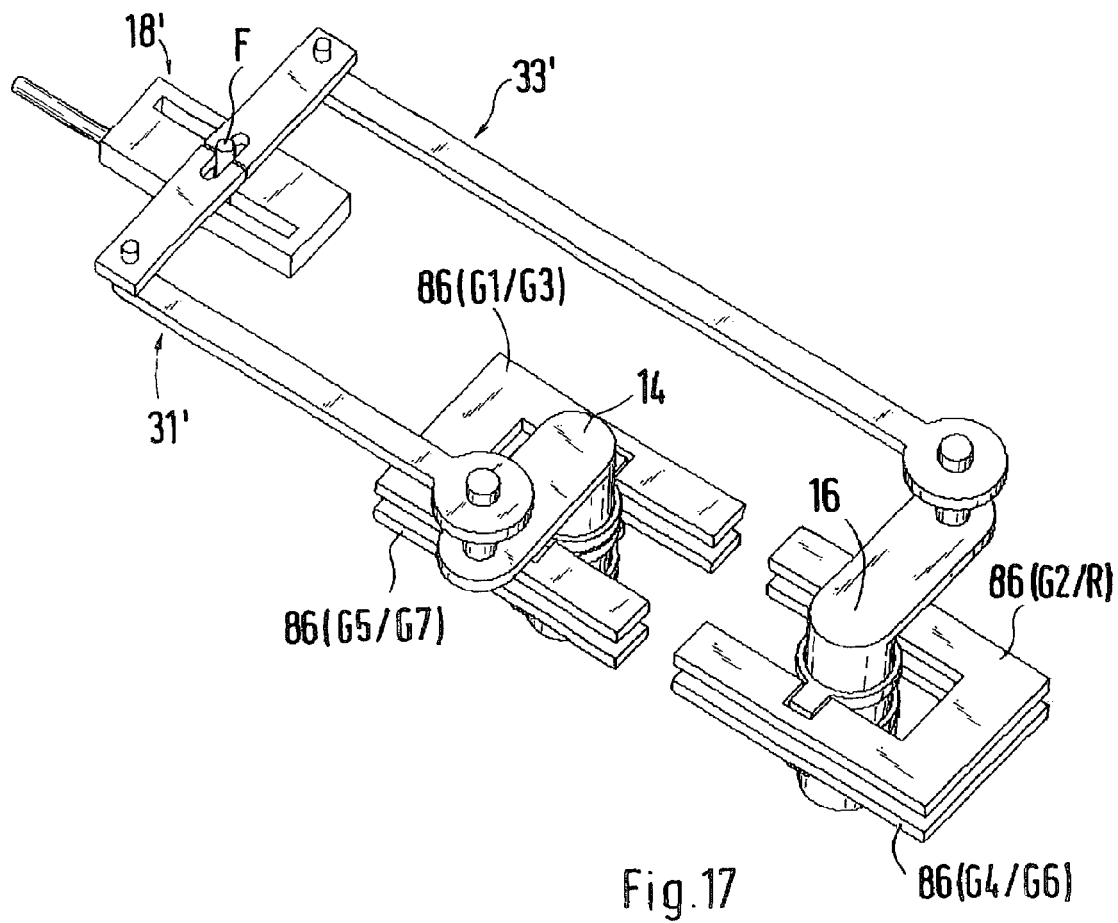
FIG. 17 is a simplified perspective view of a second embodiment of the gearshift device according to the present invention.

FIG. 17 schematically shows a second embodiment of the inventive shift control system which works according to the same functional principle and is distinguished from the first embodiment essentially by a modified gate element 18'. The gate element 18' has a linear gate guide track F which receives the guide pin P that is connected to the control cable or the gearshift linkage. The guide pin P is furthermore received in two driver elements M1 and M2, which are a component of the two idler systems 31, 33 described with reference to the first embodiment. When shifting from a neutral position N to one of the odd gears (see FIG. 19) the guide track F forces the guide pin P into the driver opening of the driver element M1, such that one of the odd gears is engaged depending on the selected shift track, analogous to the first embodiment. As shown in FIG. 20, when the odd gears are disengaged, the driver element M1 is moved back into the neutral position. If the guide pin P is moved back via the gearshift lever of the vehicle, the guide pin P switches to the driver opening of the driver element M2 and one of the even gears 2/4/6 or R can be engaged.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Multistage transmission for an internal combustion engine comprising, a drive shaft, a driven shaft on which engaged gearwheels are arranged to achieve different gear steps, clutches arranged to be actuated via shift forks to move speed gears and to generate a frictional connection with the drive shaft, and an arrangement to effect gear change, wherein gear pairs for the even gears and the odd gears are arranged side by side to comprise a dual clutch gear set, and shifter shafts are operable via at least one of a common selector control system and a gearshift control system configured to implement an H-shift pattern for actuating the clutches of the even and odd gears, wherein the gearshift control system includes a gate element connected to the arrangement to effect gear change having at least one guide track, and for each of the shifter shafts a lever idler system, one end of which is coupled to the gate element and another end of which is coupled to the shifter shafts.

2. Multistage transmission as claimed in claim 1, wherein the one end of the idler system engages the at least one guide track via a guide pin, and the another end of the idler system engages a guide groove of a bushing fixed to the shifter shafts respectively via a guide pin.

3. Multistage transmission as claimed in claim 2, wherein the bushing and the selector control system form a single unit.

4. Multistage transmission as claimed in claim 1, wherein the selector control system has a lever element connected to the arrangement to effect gear change and to which the shifter shafts are coupled.

5. Multistage transmission as claimed in claim 3, wherein ends of the lever element engage, respectively, with a guide groove of a bushing fixed to the shifter shafts via a guide pin.

6. Multistage transmission as claimed in claim 5, wherein the bushing and the selector control system form a single unit.

7. Multistage transmission an internal combustion engine comprising, a drive shaft, a driven shaft on which engaged rearwheels are arranged to achieve different gear steps, clutches arranged to be actuated via shift forks to move speed gears and to generate a frictional connection with the drive shaft, and an arrangement to effect gear change, wherein gear pairs for the even gears and the odd gears are arranged side by side to comprise a dual clutch gear set, and shifter shafts are operable via at least one of a common selector control system and a gearshift control system configured to implement an H-shift pattern for actuating the clutches of the even and odd gears, wherein a locking shaft is associated with each of the shifter shafts, axially guided via the respective shifter shaft, and has a locking structure for non-selected ones of the shift forks, and the locking shaft includes locking pins, that engage in locking grooves of shift plates of the non-selected shift forks.

* * * * *